May 4, 1926.

R. M. BARHAM

SIGN 1,583,438

Filed April 30, 1925  5 Sheets-Sheet 1

Inventor

R. M. Barham

By Lacey & Lacey, Attorneys

May 4, 1926.

R. M. BARHAM

SIGN 1,583,438

Filed April 30, 1925    5 Sheets-Sheet 2

Inventor

R. M. Barham

By Lacey Lacey, Attorneys

May 4, 1926.

R. M. BARHAM

SIGN

Filed April 30, 1925

Inventor
R. M. Barham
By [signature], Attorney

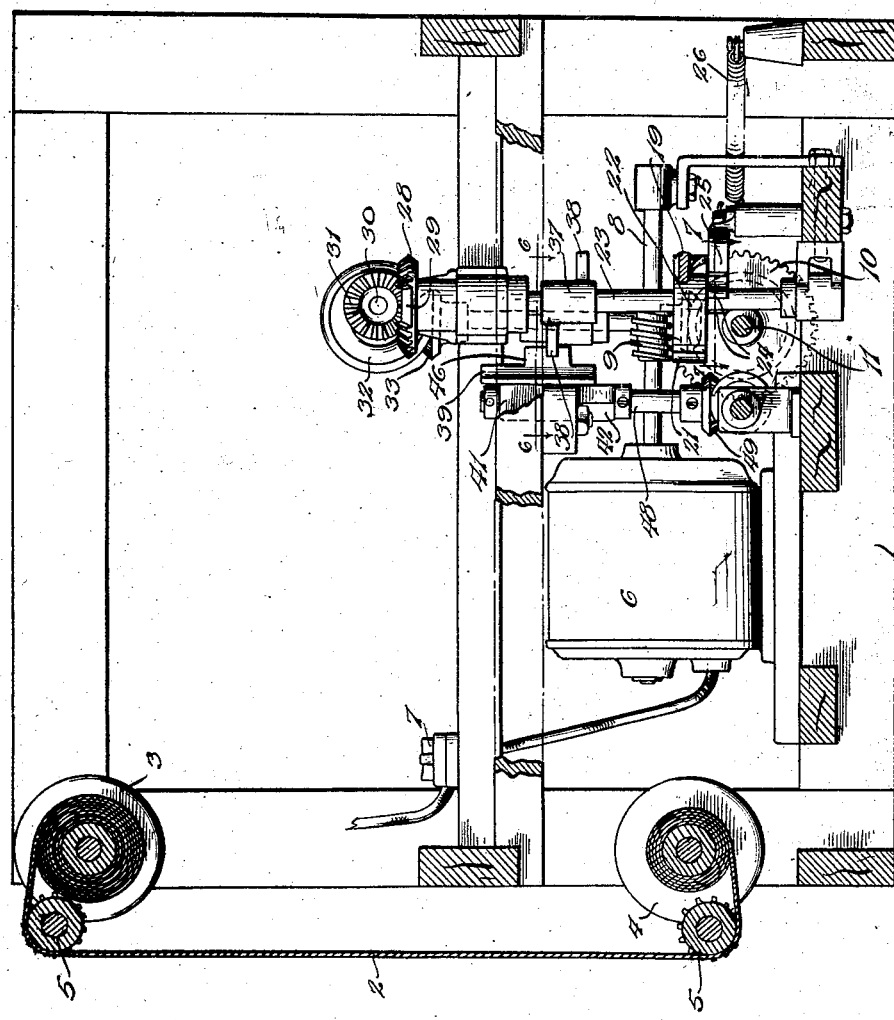

May 4, 1926.
R. M. BARHAM
SIGN
Filed April 30, 1925  5 Sheets-Sheet 5
1,583,438
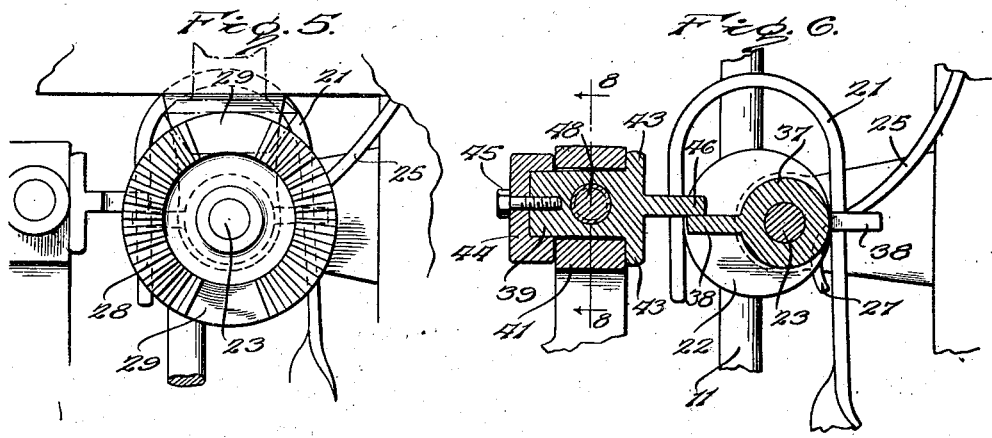
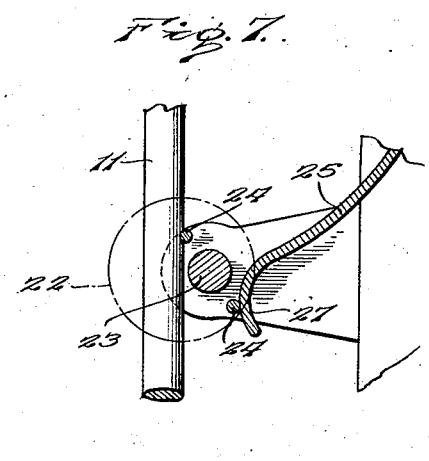
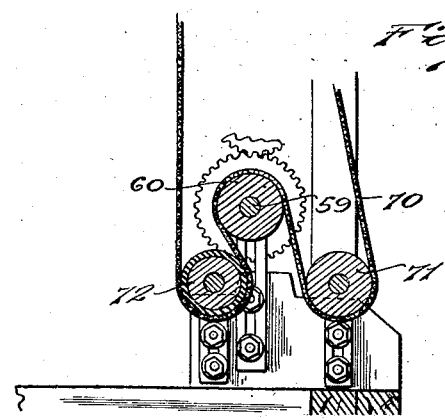
Inventor
R. M. Barham
By Lacey & Lacey, Attorneys Patented May 4, 1926.

1,583,438

UNITED STATES PATENT OFFICE.

ROBERT M. BARHAM, OF LEAKSVILLE, NORTH CAROLINA.

SIGN.

Application filed April 30, 1925. Serial No. 27,045.

*To all whom it may concern:*

Be it known that I, ROBERT M. BARHAM, a citizen of the United States, residing at Leaksville, in the county of Rockingham and State of North Carolina, have invented certain new and useful Improvements in Signs, of which the following is a specification.

This invention relates to apparatus for automatically displaying advertisements or other announcements, pictures or other matter for which publicity is desired. The invention seeks to provide a compact mechanism which will operate automatically to bring a definite section of a display member to a point of display and arrest the travel of the member temporarily so as to permit the announcement to be comprehended and then again cause travel of the display member to bring another announcement into view. The invention also has for its object the provision of a mechanism for the stated purpose which will automatically reverse the travel of the display member after the entire length thereof has been fed in one direction, and also seeks to provide means which will automatically regulate the speed of travel so as to compensate for variations in the diameters of the winding and unwinding portions of the display member. These stated objects, and other objects which will incidentally hereinafter appear, are attained in such a mechanism as is illustrated in the accompanying drawings, and the invention resides in certain novel features which will be particularly pointed out in the appended claims.

In the drawings:

Fig. 4 is a vertical section on the line 4—4 of Fig. 2;

Fig. 5 is a top plan view of the reversing cam shaft and the parts immediately adjacent the same;

Fig. 6 is an enlarged horizontal section on the line 6—6 of Fig. 4;

Fig. 7 is a similar section on the line 7—7 of Fig. 4;

Fig. 8 is a vertical section on the line 8—8 of Fig. 6, and

Fig. 9 is a detail section on the line 9—9 of Fig. 3.

In carrying out my invention, I employ a frame or supporting structure 1 which may be of any suitable construction. At one side of this frame is mounted a display belt or apron 2 upon which pictures, signs, or other matter may be painted, printed or otherwise displayed. This display belt or apron is secured at its ends to upper and lower drums 3 and 4 upon which it is adapted to wind and unwind and, adjacent the drums, passes over guide rollers 5 whereby the displayed portion of the belt is kept taut and smooth.

Figure 1:
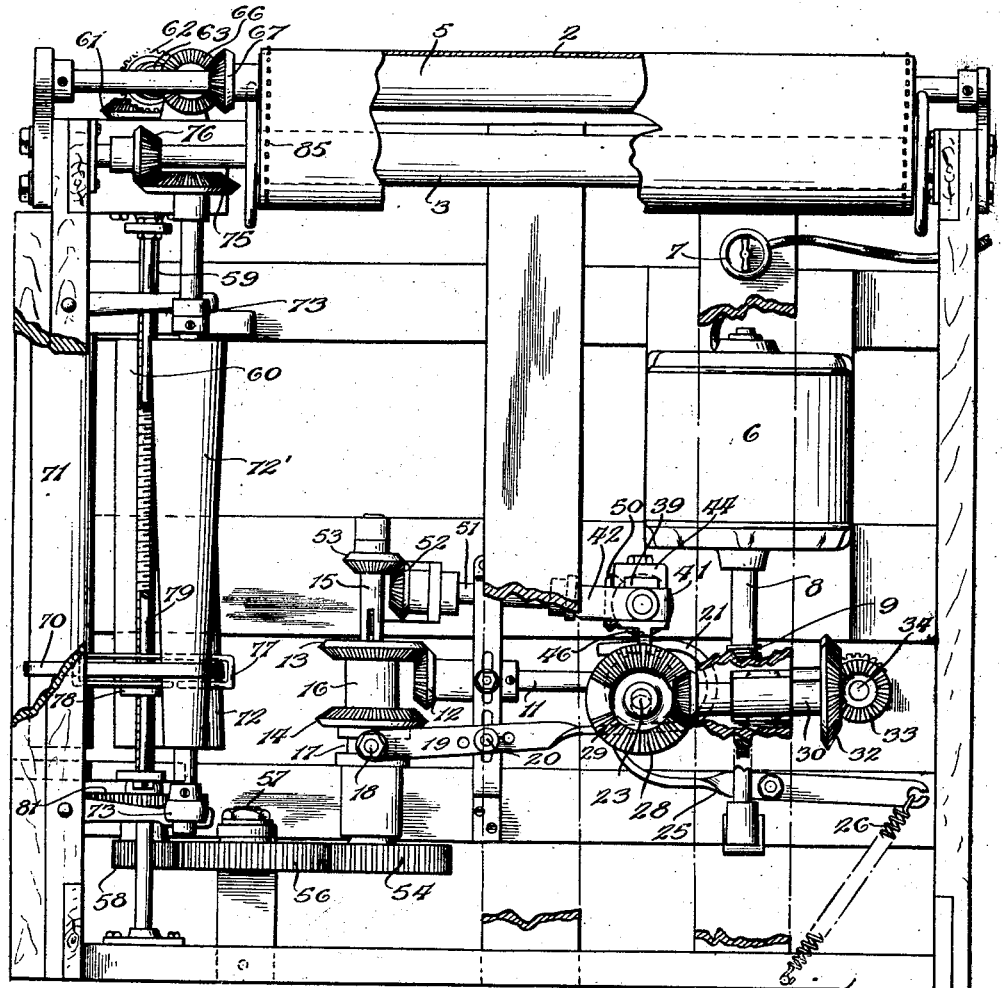
Figure 1 is a plan view of an apparatus constructed in accordance with my invention, some of the parts being broken away and some shown in section.
Figure 2:
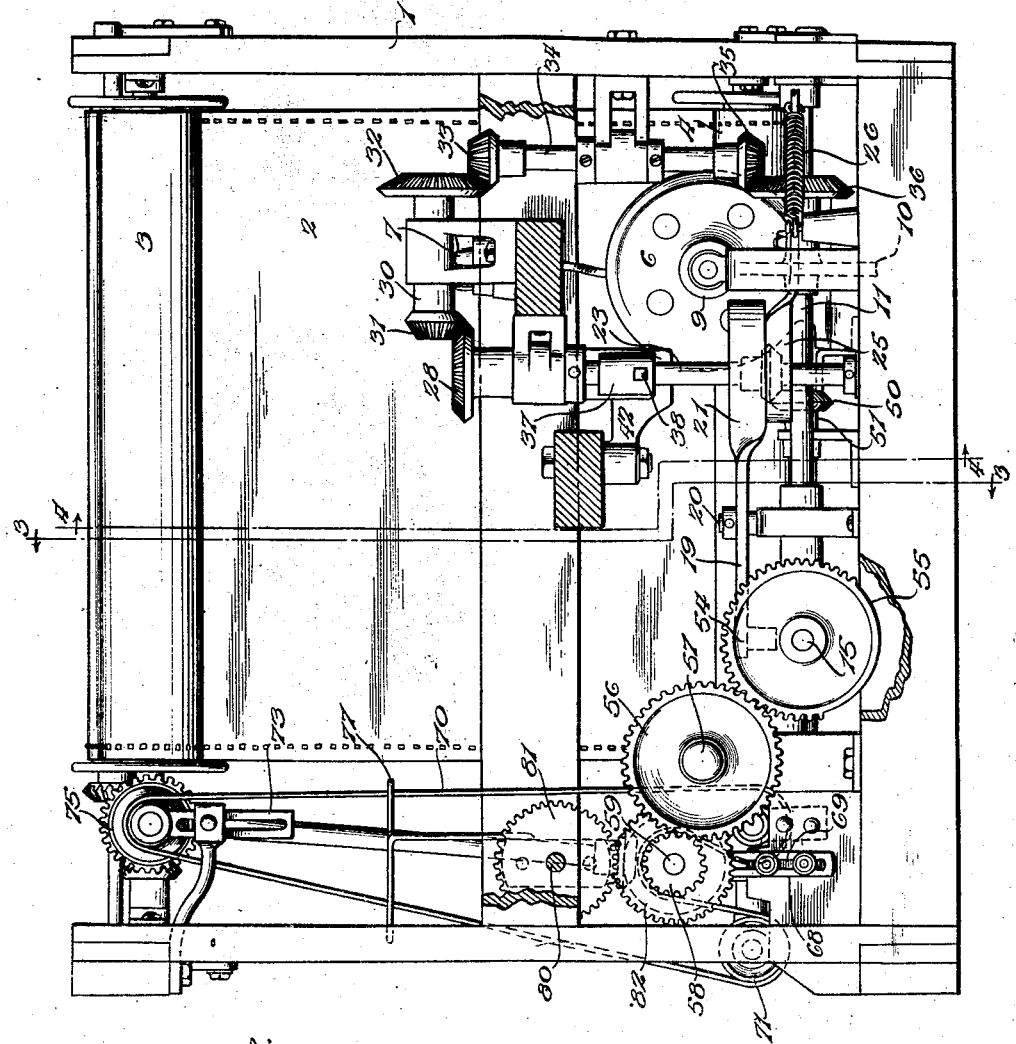
Fig. 2 is a rear elevation of the apparatus with parts broken away and in section.
Figure 3:
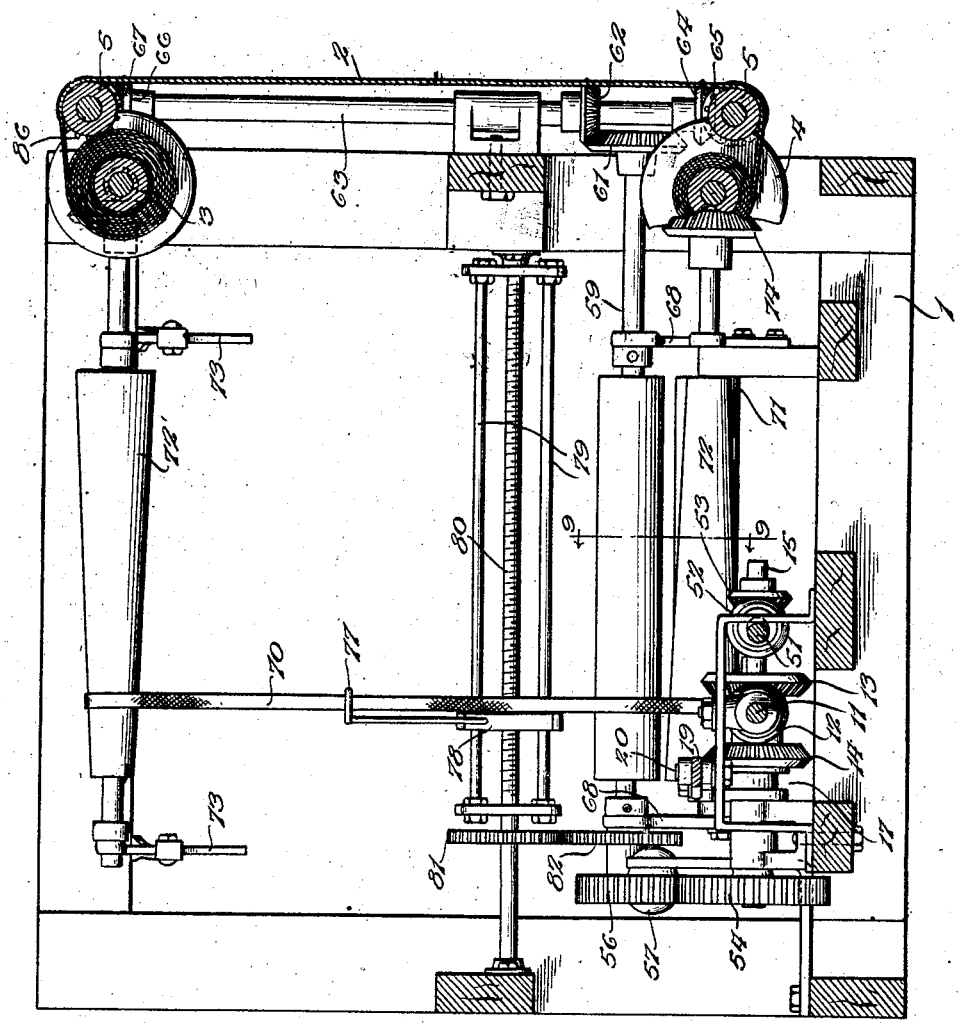
Fig. 3 is a vertical section on the line 3—3 of Fig. 2.

While the motor for driving the operating mechanism may be located at a remote point, I prefer to employ an electric motor 6 which is mounted within the frame 1 and may be connected in the usual manner with a distant source of electric energy, a switch 7 being provided whereby the current may be cut-off or on at will so that the operation of the machine may be easily controlled. The motor shaft 8 is extended beyond the motor and journaled in suitable bearings provided therefor upon the main frame. Intermediate the ends of the extended motor shaft, a worm 9 is provided thereon, and this worm meshes with a worm gear 10 upon a transmission shaft 11 journaled in suitable bearings upon the main frame below the motor shaft and at a right angle thereto. One end of this transmission shaft 11 is equipped with a beveled pinion 12 which is adapted to mesh with either one of the opposed beveled gears 13 and 14 splined upon an intermediate shaft 15 and having a common hub 16 whereby they are coupled together. One of the gears, the gear 14 in the present instance, has its hub provided with an annular groove 17 receiving a stud 18 upon the end of a reversing lever 19 which is mounted upon an adjustable fulcrum 20, as shown in Fig. 1, whereby, as the lever is rocked, the hub members 16 and 17 will be caused to slide endwise along the intermediate shaft 15 and thereby determine which gear 13 or 14 will mesh with the pinion 12 and, consequently, in which direction the shaft 15 will be rotated. The end of the lever 19 more remote from the intermediate shaft 15 is formed into a stirrup or bail 21 fitting around and engaging a cam 22 fixed to a vertical reversing shaft 23 which is mounted in suitable bearings in the main frame adjacent the transmission shaft 11 and the motor shaft 8, as shown in Figs. 1, 2 and 6. The cam 22 is provided on its under side with depending diametrically opposite pins or studs 24 which are adapted to ride upon the adjacent end of a stop lever 25. This stop lever 25 is fulcrumed upon a bracket secured upon the main frame and has its outer end connected with the side of the frame by a contractile coiled spring 26, as shown most clearly in Fig. 1. The inner end of the stop lever is of the arcuate form shown most clearly in Figs. 6 and 7 and terminates in a lateral toe 27 which is adapted to lie in rear of a stud or pin 24 and prevent retrograde movement of said stud so that the cam 22 will be permitted to move only in one direction. The function of this cam or eccentric 22 is to rock the reversing lever 19 so that the gears 13 and 14 will be shifted endwise upon the shaft 15 to periodically reverse the rotation of said shaft. As the cam or eccentric rotates with the reversing shaft 23 to which it is rigidly secured, the stud 24 immediately adjacent the toe 27 will move from said toe, whereupon the spring 26 will rock the stop lever 25 and cause its inner free end to rest against the shaft 23, as will be readily understood upon reference to Fig. 7. Eventually the rotation of the eccentric will bring the other stud 24 into contact with the concave face of the arcuate portion of the lever 25 and will ride along said face, the lever being thereby rocked about its fulcrum in opposition to the tension of the spring 26. As the rotation of the cam or eccentric proceeds, the stud 24 will clear the arcuate member of the lever and will then move relatively outwardly along the inner surface of the toe 27 which will assume the position back of the stud illustrated in Fig. 7. Motion is imparted to the reversing shaft 23 through a train of gearing which comprises a mutilated beveled gear 28 on the upper extremity of the reversing shaft, which mutilated gear has two diametrically opposite blank spaces 29. A horizontal shaft 30 is suitably supported adjacent the reversing shaft and is equipped at its inner end with a beveled gear 31 adapted to mesh with a gear 28 while upon the outer end of said shaft is a beveled gear 32 meshing with a beveled gear 33 on the upper end of a vertical shaft 34 journaled in a suitable bearing upon the main frame and equipped at its lower end with a beveled pinion 35 meshing with a beveled gear 36 on the rear end of the transmission shaft 11. Secured to the reversing shaft 23 above the cam or eccentric 22 is a hub or collar 37 provided adjacent its ends, in the same diametrical plane but at opposite sides of its axis, with the radial lugs 38 which are adapted to cooperate with a vertically adjustable stop member to limit the movement of the reversing shaft to one-half a revolution at each period of its operation. The said stop comprises a slide 39 mounted for movement in the vertical slot 40 of a yoke 41 which is carried by a bracket 42 secured upon the main frame adjacent the reversing shaft. The slide is constructed upon one face with the lateral wings 43 adapted to engage the adjacent face of the yoke 41 and the body of the slide projects beyond the opposite face of the yoke to receive a cap 44 which is secured to the projecting portion of the slide by a screw 45 and is adapted at its side edges to engage the yoke, as shown clearly in Fig. 6, whereby the slide will be positively retained in and guided by the yoke. The face of the slide presented to the reversing shaft is constructed with a rib or flange 46 which projects into the path of the lugs 38 to arrest the movement of said lugs and the reversing shaft, as shown in Fig. 6. To effect the requisite vertical movement of the slide, it is provided with an internally threaded bore engaging the threaded portion 47 of a vertical shaft 48 which is journaled in the upper and lower ends of the yoke 41 and is equipped at its lower end with a beveled pinion 49 meshing with a similar pinion 50 on the rear end of a shaft 51 which extends in the direction of the intermediate shaft 15 and is equipped with a beveled pinion 52 meshing with a beveled pinion 53 secured upon said shaft.

It will now be understood that the parts are so timed that the continuously rotating shaft 30 is idle when the pinion 31 carried thereby is opposed to one of the blank spaces 29 upon the gear 28, and at this time the rib or flange 46 of the slide is in engagement with one of the lugs 38 but is moving vertically under the influence of the shafts 15 and 51 and the connecting gearing. When the end of the rib or flange 46 clears the lug 38, said lug is obviously free to move and the strength of the spring 26 is then exerted through the lever 25 and the engaged stud 24 to partly rock the reversing shaft and bring the end of a toothed portion of the gear 28 into engagement with the pinion 31, whereupon the shaft 23 will be rotated and the eccentric 22 will rock the reversing lever 19, shifting the gears 13 and 14 so that the direction of rotation of the shaft 15 will be reversed, the slide 39 then, of course, moving in the direction opposite to that in which it had been moving. This reverse movement of the slide will obviously bring the rib 46 into the path of the stud 24 which was previously free of said slide and thereby arrest the movement of the reversing shaft at the proper time.

Upon the outer end of the shaft 15, which is the end remote from the beveled pinion 53, is secured a spur gear 54 which has a mutilated portion 55 extending approximately over one-third of its periphery. This gear 54 meshes with a transmitting gear 56 and the reversing action which has been described takes place while the mutilated portion 55 is presented to the transmitting gear. The action is also so timed that the reversing operation will only occur after the entire display web or belt 2 has been fed from one drum onto the other drum. The transmitting gear 56 is carried by a stub shaft 57 suitably secured in the main frame and it meshes with a pinion 58 secured on one end of a shaft 59 which forms the axis of a roller 60. This roller 60 and the axle or shaft carrying it are disposed at one side of the machine at a right angle to the display member 2 and the shaft is extended to the front of the frame where it is equipped with a beveled gear 61 meshing with a beveled pinion 62 on a vertical shaft 63 journaled upon the front side of the main frame. At the lower end of the shaft 63 is a beveled pinion 64 meshing with a similar pinion 65 on the end of the lower roller 5 whereby to positively rotate said roller and at the upper extremity of the shaft 63 is a similar beveled pinion 66 meshing with a pinion 67 on the adjacent end of the upper roller 5. It will thus be seen that these guide rollers are positively rotated so that, while they will serve as guides and supports for the apron or belt, they also aid in feeding the same. The shaft 59 is carried in brackets 68 which are vertically slotted, as shown at 69 in Fig. 2, whereby they may be adjustably secured upon the main frame and, consequently, serve as tighteners to maintain the smooth taut condition of a transmission belt 70, which belt is trained over the roller 60 and under rollers 71 and 72 likewise mounted for vertical adjustment upon the main frame and disposed below the roller 60 and at opposite sides of the vertical plane of the same, as shown most clearly in Fig. 9. The rollers 60 and 71 are cylindrical but the roller 72 is tapered or conical and is arranged reversely to an upper conical or tapered pulley or roller 72′ which is mounted in vertically adjustable brackets 73 secured in the upper portion of the main frame. The axles or shafts carrying the conical or tapered rollers 72 and 72′ are extended from said rollers and equipped with beveled gears 74 and 75, respectively, which mesh with corresponding beveled pinions 76 on the respective shafts of the drums 3 and 4 so that the said drums are rotated by the rotation of the tapered or conical pulleys which, in turn, are set in motion by the belt 70, and it will be understood that the relative speeds of the two drums will be determined by the position of the belt upon the tapered pulleys or rollers whereby one or the other of said pulleys or rollers will travel at a somewhat higher speed, the speed of the two pulleys or rollers being equal when the belt 70 is midway the ends thereof. To effect travel of the belt longitudinally of the tapered pulleys or rollers so that the speed of rotation will compensate for the varying diameters of the wound portions of the display member as the same is shifted from one to the other drum, I provide a shifting yoke 77 mounted upon a carrier 78 and spanning the two runs of the belt, as shown clearly in Figs. 1 and 2. The carrier 78 is a block slidably engaged at its ends upon guide rods 79 which are suitably supported in the main frame above and below a threaded rod or worm shaft 80 which engages the threaded bore of the carrier 78 and is rotatably mounted in the main frame. This threaded rod 80 is equipped with a spur gear 81 which meshes with a similar gear 82 secured on the shaft 59 which carries the roller 60 so that the threaded rod will be caused to rotate whenever the tapered rollers are rotating and the display member 2 is being shifted. The rotation of the rod 80 eventually will effect travel of the carrier 78 along the guide rods or tracks 79 and, consequently, will shift the belt 70 along the tapered rollers. Of course, when the transmission shaft 15 is reversed, the direction of travel of all the working parts is reversed so that the carrier 78 will be caused to travel alternately in opposite directions between the ends of the threaded rod 80 and the tracks 79.

It is thought the operation of the apparatus will be readily understood from the foregoing description, taken in connection with the accompanying drawings. Pictures, advertisements or other announcements which it is desired to bring before the public are painted, printed or pasted upon the web or apron 2 and the apparatus is mounted upon the side of a building or upon any fixed support which will be so located as to bring the device to the attention of passers-by. Initially, the entire length of the web 2, except so much thereof as is necessary to span the space between the two drums 3 and 4, is wound upon one drum, and the gearing is so adjusted as to cause periodical travel of the display member toward the other drum to wind thereon. The travel of the display member will be effected as long as the toothed portion of the gear 54 meshes with the intermediate gear 56, and these parts should be so proportioned that the travel will suffice to bring a picture or announcement into full view between the two rollers 5, whereupon the mutilated portion of the gear 54 will be presented to the gear 56 and the travel of the web will cease until the teeth of the gear 54 are again in mesh with the teeth of the gear 56. The reversing mechanism is inoperative until the entire length of the web has been caused to travel from one drum to the other drum, whereupon the reversing lever will be rocked to shift the gears 13 and 14 and reverse the rotation of the shaft 15 so that the display web will then be fed in the opposite direction.

My apparatus is very compact and is so arranged that access may be had to any of the elements at any time and, consequently, repairs or cleaning when needed may be easily effected. The apparatus will need no attention under normal conditions except to turn the switch 7 and thereby permit the electric current to flow into the motor or cut-off the same, as the case may be.

To maintain the web in its proper place, it is preferably provided near its side edges with perforations 85 to engage projections 86 on the rollers 5.

Having thus described the invention, I claim:

1. In a display apparatus, the combination of a display web, upper and lower drums to which the ends of the web are secured to wind and unwind thereon, means for rotating said drums including reversely arranged tapered rollers each geared to one of the drums, a transmission belt trained about said rollers, a shifting element engaged about the belt, a carrier to which said shifting element is secured, guides engaged by said carrier, means for effecting travel of the carrier along said guides whereby to shift the belt longitudinally of the rollers, means acting directly on the belt for imparting travel thereto whereby to rotate the rollers, and means for reversing the travel of the belt whereby to reverse the rotation of the rollers and drums.

2. In a display apparatus, the combination of upper and lower drums, a display web having its ends secured to said drums whereby to wind and unwind thereon and effect travel of the web between the drums, means for rotating the drums including reversely arranged tapered rollers each geared to one of the drums, a belt trained around said rollers, a roller engaged with the belt between the tapered rollers, adjustable supports for said roller whereby to maintain tension on the belt, means for rotating the last-mentioned roller whereby to impart travel to the belt and the tapered rollers, means for shifting the belt along the tapered rollers, and means for reversing the motion of the belt and said shifting means.

3. In a display apparatus, the combination of a display web, means for effecting periodical travel of the display web including an intermediate shaft, opposed gears splined on said shaft, a reversing lever operatively engaged with said gears, a motor shaft, means for transmitting motion from the motor shaft to one of the said opposed gears, other means driven from the motor shaft for rocking the reversing lever to effect reversal of the intermediate shaft through shifting of the opposed gears, and means driven from the intermediate shaft to intermittently arrest the action of the last-mentioned means.

4. In a display apparatus, the combination of a display web, means for effecting periodical travel of the display web including an intermediate shaft and a mutilated gear thereon, opposed gears splined upon the intermediate shaft, a rocking lever arranged to shift said opposed gears, a motor shaft, gearing actuated by the motor shaft and adapted to drive one of the said opposed gears, a reversing shaft, gearing connecting the reversing shaft with the motor shaft, an eccentric on the reversing shaft engaging the reversing lever, and means for limiting the movement of the reversing shaft.

5. In a display apparatus, the combination of a display web, means for effecting periodical travel of the web including an intermediate shaft and a mutilated gear thereon, a motor shaft, a transmission shaft driven directly from the motor shaft, opposed gears splined upon the intermediate shaft, a reversing shaft, gearing connecting the reversing shaft with the motor shaft to periodically actuate the reversing shaft, a reversing lever having one end operatively connected with the opposed gears on the intermediate shaft whereby to cause one or the other to be engaged with the transmission shaft, one end of said lever being formed into a loop encircling the reversing shaft, an eccentric on the reversing shaft engaged in said loop whereby movement of the reversing shaft will rock the reversing lever, and means for limiting the movement of the reversing shaft.

6. In a display apparatus, the combination of a display web, means for periodically effecting travel of said web including an intermediate shaft and a mutilated gear thereon, a reversing shaft, an eccentric on said reversing shaft, a reversing lever engaged with said eccentric, opposed gears mounted on the intermediate shaft and shiftable by the reversing lever, a motor shaft, means for transmitting the movement of the motor shaft to one of the said opposed gears, gearing connecting the motor shaft with the reversing shaft whereby to periodically actuate the reversing shaft, spaced studs depending from the eccentric, a check lever arranged to extend into the path of said studs and engage in rear of one of the same, means for yieldably holding said lever in the path of the studs, and means for limiting the rotation of the reversing shaft.

7. In a display apparatus, the combination of a display web, means for periodically effecting travel of the web including an intermediate shaft and a mutilated gear thereon, means for reversing the rotation of said intermediate shaft including a reversing shaft, oppositely extending lugs radiating from the reversing shaft, a slide normally disposed in the path of said lugs, means driven by the intermediate shaft for shifting the slide to clear the lugs and permit rotation of the reversing shaft, means including a mutilated gear for rotating the reversing shaft, means for rotating the intermediate shaft, and means controlled by the reversing shaft for shifting the last-mentioned means.

In testimony whereof I affix my signature.

ROBERT M. BARHAM. [L. S.]